United States Patent [19]

Alexander

[11] Patent Number: 5,575,682
[45] Date of Patent: Nov. 19, 1996

[54] APPARATUS FOR ACCESSING THE BATTERY POWER OF AN ELECTRICAL DEVICE

[76] Inventor: Mark Alexander, 25 Rockledge Ave., White Plains, N.Y. 10601

[21] Appl. No.: 285,112

[22] Filed: Aug. 3, 1994

[51] Int. Cl.⁶ .................................................. H01M 2/06
[52] U.S. Cl. ............................ 439/500; 429/121; 439/77
[58] Field of Search ........................ 439/500, 55, 67, 439/77; 429/121, 123, 96, 100, 163; 200/512, 238, 506

[56] References Cited

U.S. PATENT DOCUMENTS

| | | | |
|---|---|---|---|
| 3,040,119 | 6/1962 | Granzow | 439/55 |
| 3,553,033 | 1/1971 | Page | 439/77 X |
| 3,636,311 | 1/1972 | Steger | 219/522 |
| 3,911,234 | 10/1975 | Kotaka | 200/5 A |
| 4,091,187 | 5/1978 | Kaye | 429/100 |
| 4,177,519 | 12/1979 | Kasubuchi | 364/712 |
| 4,935,851 | 6/1980 | Wood | 362/103 |
| 5,147,985 | 10/1992 | DuBrucq | 429/124 |
| 5,186,653 | 2/1993 | Robert | 439/500 |
| 5,196,374 | 3/1993 | Hundt et al. | 429/123 |
| 5,376,476 | 12/1994 | Eylon | 429/100 |

*Primary Examiner*—Renee S. Luebke
*Attorney, Agent, or Firm*—Steinberg, Raskin & Davidson P.C.

[57] ABSTRACT

Apparatus for accessing the power of a battery or batteries situated in the battery compartment of a first electrical device including a flexible sheet or strip member which is situated in the battery compartment of the first electrical device before the battery or batteries are inserted, a first pair of electrically conductive contact zones on opposed sheet member surfaces in aligned and electrically coupled relationship with each other, a second pair of electrically conductive contact zones on opposed sheet member surfaces in aligned and electrically coupled relationship with each other and electrically insulated from the contact zones of the first pair, and conductors for electrically connecting the coupled and aligned contact zones of the first pair and the coupled and aligned contact zones of the second pair into an electrical circuit for operating a second electrical device.

28 Claims, 3 Drawing Sheets

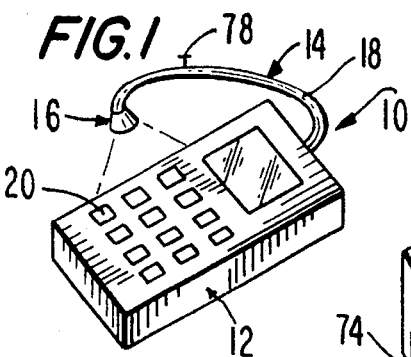
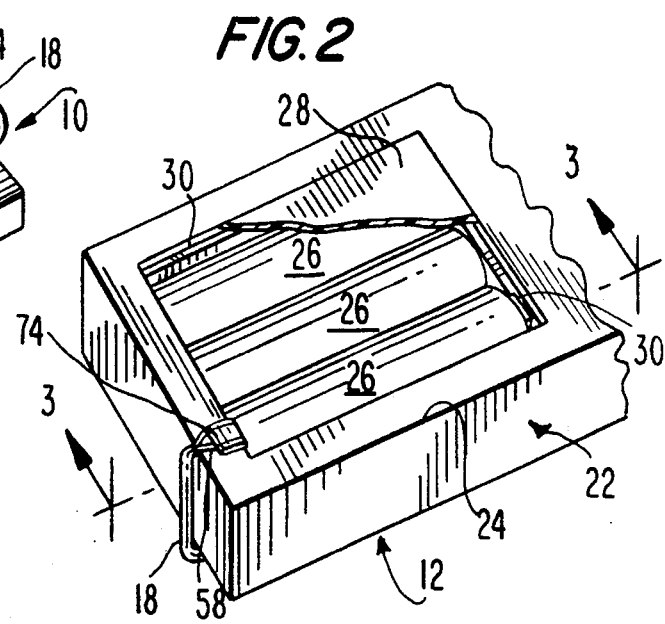
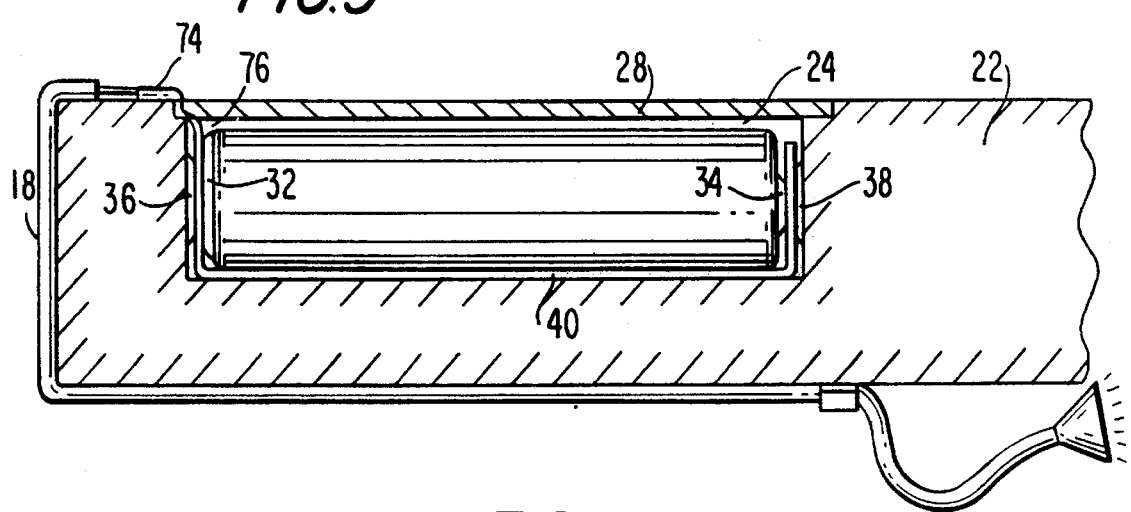
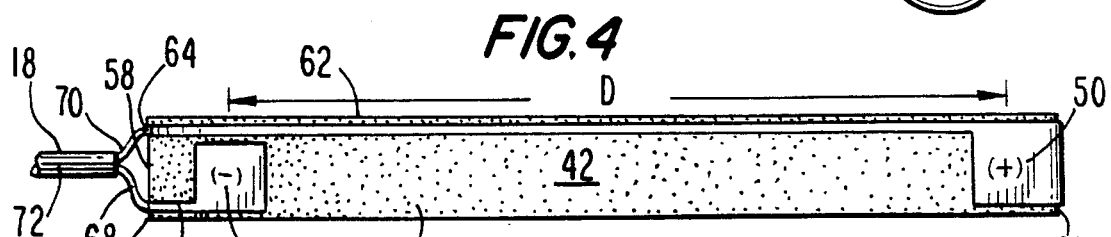
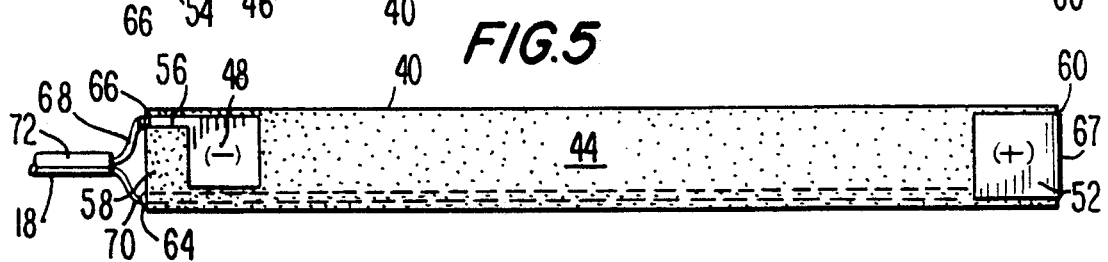

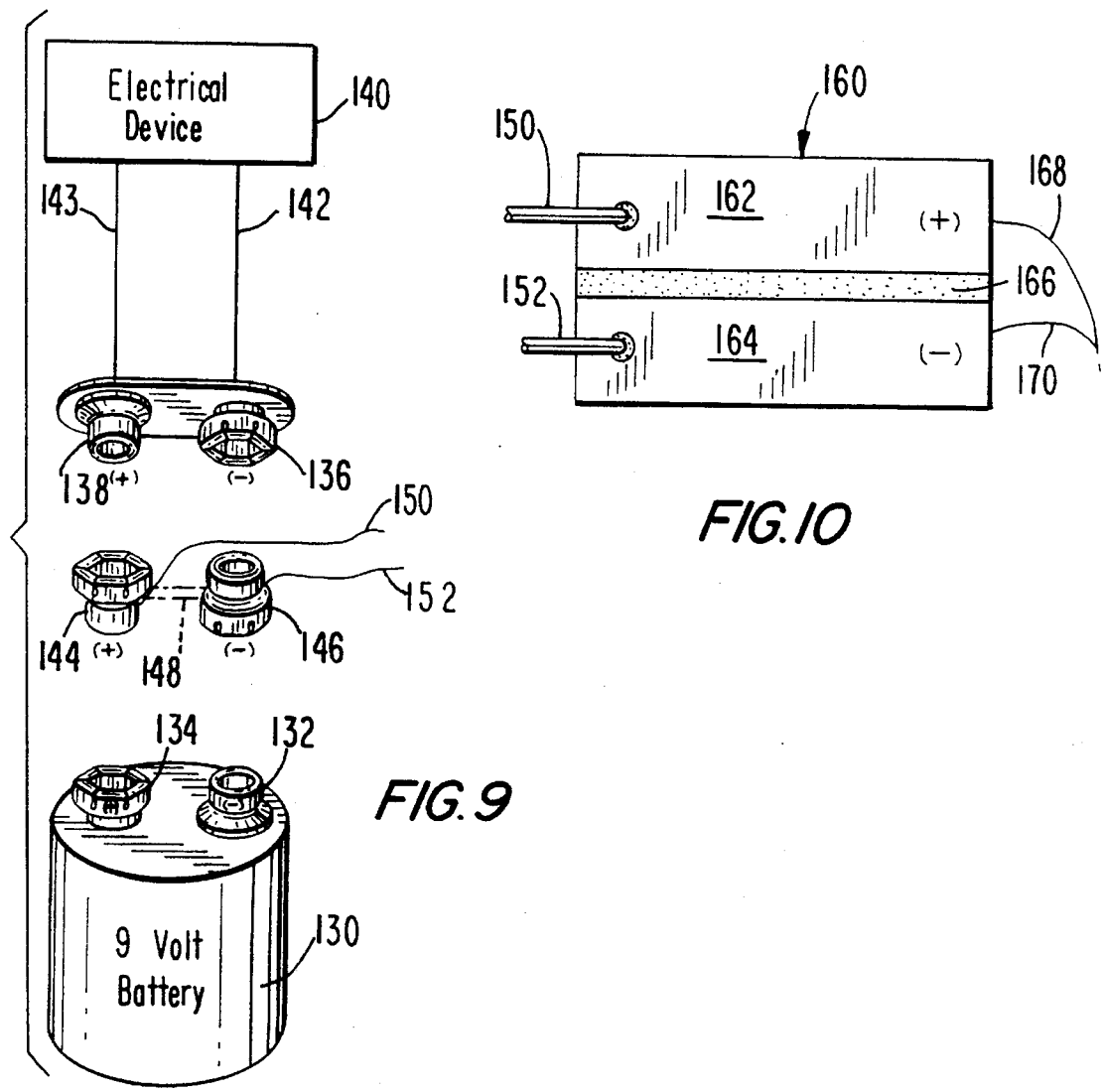

APPARATUS FOR ACCESSING THE BATTERY POWER OF AN ELECTRICAL DEVICE

BACKGROUND OF THE INVENTION

This invention relates generally to battery powered electrical devices and, more particularly, to apparatus for accessing the battery power of such electrical devices.

Electrical devices powered by small batteries are now used in virtually every sector of society by both adults and children. For example, remote control transmitters powered by "AA" size batteries for operating appliances such as T.V.'s are in widespread use. Similarly, battery powered personal stereos are in widespread use. In the business sector, battery powered hand-held tape recorders and calculators are also in common use. All of these devices generally comprise a housing having a battery compartment for receiving one or more batteries. For each battery received in the compartment there is a pair of spaced battery contacts which electrically engage the terminals of the battery electrodes when the battery is situated in the compartment. A removable cover generally closes the compartment.

At present, while batteries are situated in the battery compartment of an electrical device of the type described above, they cannot be used to supply power to another device. Therefore, if it is desired to operate another battery powered electrical device, it is necessary to either purchase additional batteries or remove the batteries from the first device and utilize them in the second device. Neither of these alternatives, however, are entirely satisfactory. The purchase of additional batteries involves additional costs and may be wasteful if both devices are not used simultaneously. On the other hand, it is not always convenient to continuously exchange the same batteries between two different devices and, of course, the two devices cannot be operated at the same time.

OBJECTS AND SUMMARY OF THE INVENTION

Accordingly, it is an object of the present invention to provide new and improved apparatus for accessing the power of one or more batteries situated in the battery compartment of an electrical device for supplying power to another battery powered device without removing the batteries from the battery compartment of the first device.

Another object of the present invention is to provide new and improved apparatus for accessing the power of one or more batteries situated in the battery compartment of an electrical device which is simple in construction and use.

Still another object of the present invention is to provide new and improved apparatus for accessing the battery power of an electrical device for operating another battery powered device either at the same time the first device is operated or by itself.

A further object of the present invention is to provide a new and improved assembly including a first battery powered electrical device, a second battery powered electrical device, and apparatus for accessing the battery power of the first device to operate the second device.

Yet another object of the present invention is to provide a new and improved assembly including a remote control device, a lamp device for illuminating the buttons of the remote control and apparatus for accessing the battery power of the remote control to operate the lamp.

Briefly, in accordance with the present invention, these and other objects are attained by providing apparatus for accessing the power of a battery or batteries situated in the battery compartment of a first electrical device comprising a flexible sheet or strip member, a first pair of electrically conductive contact zones on opposed sheet member surfaces in aligned and electrically coupled relationship with each other, a second pair of electrically conductive contact zones on opposed sheet member surfaces in aligned and electrically coupled relationship with each other and electrically insulated from the contact zones of the first pair, and conductor means for electrically connecting the coupled and aligned contact zones of the first pair and the coupled and aligned contact zones of the second pair into an electrical circuit for operating a second electrical device. The flexible sheet member is situated in the battery compartment of the first electrical device before the battery or batteries are inserted so that a contact zone of each of the first and second pairs engages a respective one of the battery compartment contacts. Upon insertion of the battery, each of the other contact zones of the first and second pairs engages a respective one of the battery electrode terminals. Since the pair of contact zones of each of the first and second pairs of contact zones are electrically coupled to each other, the battery electrode terminals are electrically coupled to respective battery compartment contacts to power the first electrical device. At the same time, the conductor means, which may comprise a pair of flexible conductors, electrically couple the first and second pairs of contact zones which engage the battery terminals into an external electrical circuit for operating a second electrical device.

In another embodiment of the invention, for use, e.g., with a 9 volt battery, electrically conductive coupling elements are arranged in connection with the positive and negative battery terminals on the battery intermediate of the battery terminals and electrical contacts of the electrical device. The conductive coupling elements have corresponding mating surfaces for engaging with one of the electrode terminals of the battery and one of the electrical contacts of the electrical device. First conductor means electrically connect the conductive coupling elements to respective conductive material portions, such as coatings, arranged on a thin sheet member or substrate. The member or substrate is very thin and passes through the space between the battery compartment cover and the exterior. The substrate may be a thin sheet of non-conductive, insulative material having opposed sides on which the conductive material portions are situated or two portions of conductive material separated by a strip of insulative material. Second conductor means such as wires are connected to each of the conductive material portions outside of the battery compartment and electrically connect the conductive material portions into an external electrical circuit for operating a second electrical device.

In accordance with the assembly of the invention, the above-mentioned first electrical device may comprise a remote control device for operating an electrical appliance, such as a T.V., and the second electrical device may comprise a lamp for illuminating the buttons thereof.

BRIEF DESCRIPTION OF THE DRAWINGS

The invention will be readily understood by reference to the following detailed description when considered in connection with the accompanying drawings in which:

FIG. 1 is a schematic perspective view of an embodiment of an assembly in accordance with the invention including a battery powered remote control transmitter, apparatus for accessing the power of the battery of the remote control, and a lamp for illuminating the remote control buttons;

FIG. 2 is a fragmentary perspective view of the underside of the remote control illustrated in FIG. 1 showing the battery compartment and a terminal length portion of the sheet or strip member and conductors comprising components of apparatus for accessing the power of a remote control battery;

FIG. 3 is a section view taken along line 3—3 of FIG. 2;

FIG. 4 is a fragmentary top plan view of apparatus for accessing the battery power of the remote control illustrated in FIGS. 1–3;

FIG. 5 is a fragmentary bottom plan view thereof;

FIG. 9 is a schematic perspective view of components of a fourth embodiment of an apparatus for accessing the battery power of an electronic device in accordance with the invention;

FIG. 10 is a fragmentary top plan view of a first alternative embodiment of a thin sheet member component for use with the apparatus shown in FIG. 9;

FIG. 11A is a top plan view of a second alternative embodiment of a thin sheet member component for use with the apparatus shown in FIG. 9;

FIG. 11B is a bottom plan view of the second alternative embodiment of the thin sheet member component shown in FIG. 11A.

DETAILED DESCRIPTION OF THE PREFERRED EMBODIMENTS

Figure 6:
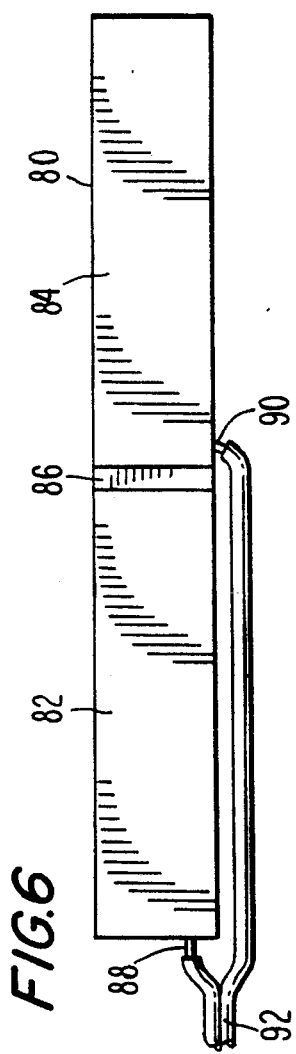
FIG. 6 is a fragmentary top plan view of a second embodiment of apparatus for accessing the battery power of an electronic device in accordance with the invention.

Referring now to the drawings wherein like reference characters designate identical or corresponding parts throughout the several views, and more particularly to FIGS. 1 and 2, an assembly in accordance with the present invention, generally designated 10, comprises a battery powered hand held remote control transmitter 12, a battery powered lamp device 16 for illuminating the buttons 20 of the remote control, and apparatus 14 including a wire cable 18 for accessing the power of the remote control battery for operating lamp 16. By situating a lamp 16 as shown, the buttons 20 of the remote control can be readily discerned in the dark.

Remote control 12 comprises a housing 22 in which a battery compartment 24 is provided for receiving three batteries 26 for providing power to operate the remote control 12. The compartment 24 is closed by means of a cover 28 which is positioned on shoulders 30 provided on sides of the compartment entrance opening.

The batteries 26 each comprise a conventional elongate cylindrical battery having negative (−) and positive (+) electrode terminals 32 and 34 at its ends, and may, for example, typically comprise size AA batteries. Negative and positive battery contacts 36 and 38 are provided in the battery compartment 24 for each of the batteries 26 which normally engage respective ones of the battery electrodes 32 and 34.

Referring now to FIGS. 3–5 in which a first embodiment of the invention is illustrated, apparatus 14 for accessing the power of one of the batteries 26 of the remote control 12 for operating the lamp 16 comprises a thin flexible sheet or strip member in the form of an elongate substrate 40 formed of insulative material such as polyamide resin and having opposite surfaces 42 and 44. A first pair of electrically conductive contact zones 46 and 48 are printed on opposed surfaces 42 and 44 of substrate 40 in aligned relationship with each other. Similarly, a second pair of electrically conductive contact zones 50 and 52 are printed on opposed surfaces 42 and 44 of substrate 40 in aligned relationship with each other. The contact zones 46 and 48 of the first pair are spaced a distance D and are electrically insulated from the contact zones 50 and 52 of the second pair. Leads 54 and 56 of conductive material extend from the aligned first pair of contact zones 46 and 48 respectively and are electrically coupled to each other at a first edge region 66 of an edge 58 of substrate 40 to thereby electrically couple the aligned contact zones 46 and 48 of the first pair of contact zones to each other. The contact zones 50 and 52 of the second pair of aligned contact zones are electrically coupled to each other by means of conductive surfaces which form extensions of the respective contact zones and which meet at an edge region 67 at the other edge 60 of substrate 40.

A conductive lead 62 is printed on the surface 42 of substrate 40 and electrically couples the contact zones 50 and 52 of the second pair of aligned and coupled contact zones to a second edge region 64 of substrate edge 58 proximate to first edge region 66. The conductive lead 62 and contact zone 46 are appropriately formed to insure that electrical coupling between them is avoided regardless of the orientation of the battery, i.e., in a manner which insures that neither the negative battery electrode terminal 32 nor the positive terminal 34 will bridge the distance between lead 62 and contact zone 46 when the battery is situated in compartment 24.

A pair of flexible conductor wires 68 and 70 are connected at their ends to the first and second edge regions 66 and 64 of substrate 40 and are thereby electrically coupled to the first and second pairs of aligned contact zones 46, 48 and 50, 52 respectively. The wires 68 and 70 are insulated and enclosed within an insulative sheath 72 to constitute the wire cable 18 (FIG. 1).

In use, before placing the batteries 26 in compartment 24, the flexible substrate 40 is situated within the battery compartment so that the major portion of its length between the first and second pairs of aligned contact zones is situated on the bottom of the battery compartment. The distance D separating the first and second pairs of aligned contact zones is such that the contact zones 48 and 52 on substrate surface 44 will overlie and engage the negative and positive battery compartment contacts 36 and 38 respectively. Upon inserting batteries 26 into the battery compartment 24, the negative and positive battery electrode terminals 32 and 34 of one of the batteries electrically engage the contact zones 46 and 50 on the surface 42 of substrate 40. It will be seen that the negative battery compartment contact 36 is in electrical engagement with the negative battery electrode terminal 32 through the first pair of aligned and coupled contact zones 46 and 48 while the positive battery compartment contact 38 and positive battery electrode terminal 34 are electrically coupled through the second pair of aligned and coupled contact zones 50 and 52. Therefore, the installation of the sheet or strip member in the battery compartment does not affect the power supplied by the batteries 26 to the remote control 12 when the lamp 16 is turned off and not using power. When the lamp 16 is turned on and using power, the battery 26 is supplying both the remote control 12 and the lamp 16 with power.

Referring to FIGS. 2 and 3, the flexible substrate 40 comprises a terminal length potion 74 arranged adjacent the transverse edge 58 at which the conductor wires 68 and 70 are respectively coupled to the two aligned pairs of contact zones 46, 48 and 50, 52 at regions 66, 64 of substrate edge 58. As best seen in FIG. 3, the terminal length portion 74 passes through the narrow space between the lower edge 76 of battery compartment cover 28 and the adjacent side of the compartment opening so that the end of the substrate 40 at which the conductor wires 68 and 70 are connected is situated at the exterior of the battery compartment. The wire cable 18 enclosing conductors 68, 70 extends around to the front of the remote control housing 22. The lamp 16 is connected to the ends of wires 68, 70 to complete an external electrical circuit which operates the lamp 16. Thus, an electric circuit is formed from negative battery electrode terminal 32 to contact zone 46 to conductive lead 54 to wire 68 to lamp 16 to wire 70 to conductive lead 62 to contact zone 50 to positive battery electrode terminal 34. A switch 78 (FIG. 1) may be placed in the circuit to control the operation of lamp 16.

It is seen from the foregoing that the power of a remote control battery 26 can be accessed in accordance with the invention for supplying power to a lamp 16 without removing the battery 26 from its normal position within battery compartment 24. The substrate 40 is sufficiently thin to allow battery compartment 24 to be closed by cover 28. The lamp 16 can be operated either at the same time as the remote control is operated, or by itself.

Referring to FIG. 6, a second embodiment of the apparatus for accessing the power of a battery of an electronic device of the type described above is illustrated. The apparatus includes a flexible sheet member in the form of a thin lamina 80 essentially formed of electrically conductive material, such as copper. In particular, the lamina 80 includes first and second copper strip portions 82 and 84 which are interconnected to each other by means of an intermediate connector portion 86 formed of insulative material such as suitable sheet plastic. It will be understood that the entire opposite surfaces of the strip portions 82 and 84 constitute the first and second pairs of electrically conductive contact zones which are in aligned relationship with each other and which are electrically coupled to each other via the thickness of the copper material strip portions. Conductor wires 88 and 90 are electrically connected to the coupled and aligned pairs of contact zones and are integrated into a single insulated wire cable 92. In this embodiment the conductor 90 must extend from within the battery compartment to its outside and therefore should be formed of very small diameter wire.

Figure 7:
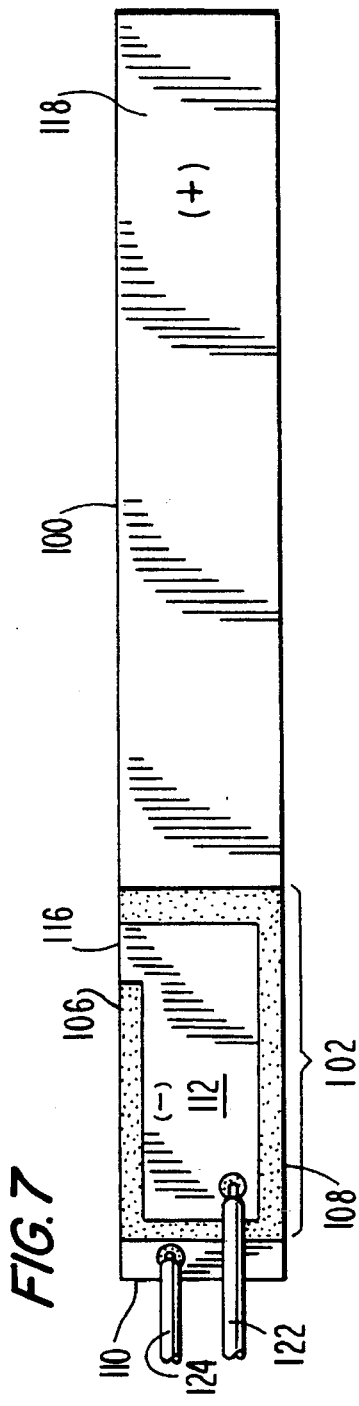
FIG. 7 is a fragmentary top plan view of a third embodiment of apparatus for accessing the battery power of an electronic device in accordance with the invention.
Figure 8:
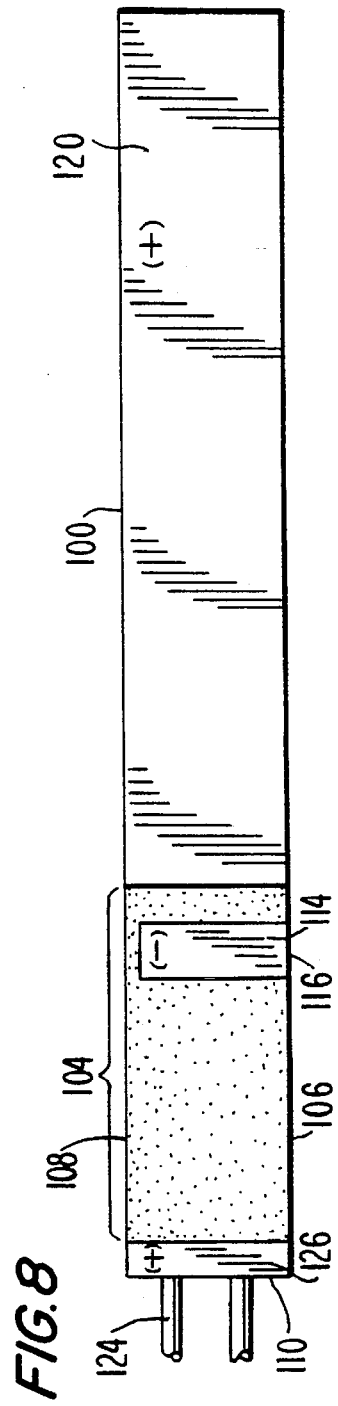
FIG. 8 is a fragmentary bottom plan view thereof.

Referring now to FIGS. 7 and 8, a third embodiment of apparatus for accessing the power of a battery of an electronic device in accordance with the invention is illustrated. The apparatus includes a thin flexible sheet member in the form of an electrically conductive metal strip 100 of the same type as the copper lamina 80 of the embodiment of the invention illustrated in FIG. 6. Opposed surface regions 102 and 104 and the two coextensive edge regions 106 and 108 at one end of conductive strip 100 (the left end in FIGS. 7 and 8) are coated in their entirety with thin layers of insulative, non-conductive material. Opposed insulated regions 102 and 104 terminate a short distance from the transverse edge 110 of strip 100. A pair of opposed contact zones 112, 114 in the form of thin layers of conductive material are printed over the insulated regions 102 and 104 respectively and are electrically coupled to each other by conductive material 116 printed over the insulated edge region 106. Thus, opposed contact zones 112, 114 constitute a first pair of electrically conductive contact zones which are aligned and electrically coupled with each other, and are adapted to electrically engage the negative battery electrode terminal. On the other hand, opposed surface regions 118, 120 at the other end of the conductive strip 100 (the right end in FIGS. 7 and 8) constitute a second pair of electrically conductive contact zones which are aligned and electrically coupled with each other, and are adapted to electrically engage the positive battery electrode terminal. A first conductor wire 122 is coupled to the first pair of opposed contact zones 112, 114 through connection to zone 112. A second conductor wire 124 is coupled to the second pair of opposed contact zones 118, 120 through connection to the terminal end portion 126 of strip 100 which electrically communicates with the second pair of contact zones 118, 120 through the thickness of the conductive strip 100.

Referring to FIGS. 9, 10, 11A and 11 B, a fourth embodiment of the apparatus for accessing the power of a battery of an electronic device in accordance with the invention is illustrated. This embodiment of the invention may be used in arrangement with a conventional 9 volt battery 130 which differs from typical AA or AAA batteries used in standard electrical devices in that both negative (−) and positive (+) electrode terminals 132,134, respectively, are situated on the same side of the battery in proximity to one another. Of terminals 132, 134, the positive terminal, in this case terminal 134, is provided with a female crown construction whereas the negative terminal, in this case terminal 132, is provided with a male cylindrical construction. Negative and positive battery contacts 136,138 are provided in the battery compartment of the electrical device (schematically illustrated at 140) for respective ones of the electrode terminals which normally connect the battery 130 to the circuitry of the electrical device 140 via respective conductor leads 142,143 coupled to the battery contacts 136,138. To provide a proper fit, the positive battery contact 138 is provided with a male cylindrical construction which engages or mates with the female crown construction of the positive electrode terminal 134 on the battery 130. Similarly, the negative battery contact 136 is provided with a female crown construction which engages or mates with the male cylindrical construction of the negative electrode terminal 132 of the battery 130. The negative and positive battery contacts 136,138 may be arranged on a common supporting element. All of this construction is conventional.

In this embodiment, the apparatus includes a first electrically conductive coupling element 144 connected between the positive electrode terminal 134 of the battery 130 and the positive battery contact 138 coupled to the electrical device 140. Conductive coupling element 144 has a female crown construction on one side and a cylindrical male construction on the other side so that the male side mates with the positive electrode terminal 134 while the female side mates with the positive battery contact 138. In a like manner, a second electrically conductive coupling element 146 is connected between the negative electrode terminal 132 of the battery 130 and the negative battery contact 136 coupled to the electrical device 140. Conductive coupling element 146 has a female crown construction on one side and a male cylindrical construction on the other side so that the female side mates with the negative electrode terminal 132 while the male side mates with the negative battery contact 136. The first and second conductive coupling elements 144,146 may be arranged independent of one another or on a common member 148 as shown in phantom lines in which case the member comprises non-conductive material to prevent electrical contact between the elements 144,146. Conductor means such as wires 150,152 are respectively coupled to the first and second conductive coupling elements 144,146.

It will be seen that the negative battery contact 136 of the electrical device 140 is in electrical engagement with the negative battery electrode terminal 132 through the first conductive coupling element 146 while the positive battery contact 138 of the electrical device and positive battery electrode terminal 134 are electrically coupled through the second conductive coupling element 144. It is also possible to provide more than one intermediate pair of conductive coupling elements so that a plurality of electrical devices can be coupled to the battery.

Referring to FIG. 10, a flexible, thin sheet member component of the apparatus comprises a thin lamina 160 essentially formed of electrically conductive material, such as copper. The lamina 160 has first and second portions 162 and 164 which are interconnected to each other by means of an intermediate connector portion 166 formed of insulative material such as suitable sheet plastic. The conductors 150,152 are connected to the first and second portions 162,164, respectively. Additional conductor means such as wires 168,170 are connected to the first and second portions, respectively. The lamina 160 is of sufficient length and thinness to extend from the interior of the battery compartment of the first electrical device 140 through the space between the battery compartment and the walls defining the battery compartment to a position exterior to the battery compartment so that the segment of the lamina 160 to which wires 168,170 are coupled is situated externally of the battery compartment. The lamina 160 can be made thinner than the wires 168,170 so that it can pass in the small space between the battery compartment and the walls defining the battery compartment whereas the wires 168,170 could not. The wires 168,170 may be joined in a common sheath and lead to a second electrical device placing this second electrical device and the battery in a common circuit.

Referring now to FIGS. 11A and 11B, instead of the thin lamina shown in FIG. 10, it is possible to connect the conductor wires 150,152 to a thin flexible sheet member in the form of an electrically non-conductive, insulative strip 180 having opposed substantially planar sides 192,194. On one side 192 of the strip, a first electrically conductive material coating 182, e.g., formed of copper, is arranged as shown in FIG. 11A. On the other side 194 of strip 180, a second electrically conductive material coating 184 is arranged as shown in FIG. 11B so that the first and second coatings 182,184 are insulated from one another. Coatings 182,184 may extend substantially across the entire length of the strip 180 as shown. Conductor wires 150,152 from the conductive coupling elements arranged in connection with the battery 130 connect to respective coatings 182,184. As in the embodiment of FIG. 10, additional conductor means 186,188 are connected to the portions of conductive materials 182,184, respectively, for connection of a second electrical device into an electrical circuit with the battery 130.

The present invention is not limited to the particular illustrated embodiment. For example, the invention may be utilized for accessing the battery power of electrical devices other than remote controls such as personal stereos, calculators, and tape recorders, to operate devices other than lamps, such as clocks, alarms and the like. Other configurations may be utilized for defining the opposed pairs of aligned contact zones. Moreover, it will be understood by those skilled in the art that the invention includes apparatus for accessing the power of more than a single battery in the compartment.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. Apparatus for accessing power of at least one battery having a pair of spaced electrode terminals and situated in a battery compartment of a first electrical device said battery compartment including a pair of battery contacts aligning with respective ones of said battery electrode terminals comprising:

a thin sheet member having opposite surfaces;

a first pair of electrically conductive contact zones on said opposite sheet member surfaces in aligned and electrically coupled relationship with each other, said first pair of contact zones being situated between a first one of said battery contacts and a first one of said battery electrode terminals and electrically coupling said first battery electrode terminal to said first battery contact;

a second pair of electrically conductive contact zones on said opposite sheet member surfaces in aligned and electrically coupled relationship with each other, said contact zones of said first pair being electrically insulated and spaced from the contact zones of said second pair, said second pair of contact zones being situated between a second one of said battery contacts and a second one of said battery electrode terminals and electrically coupling said second battery electrode terminal to said second battery contact; and conductor means for electrically connecting said coupled and aligned contact zones of said first pair and said coupled and aligned contact zones of said second pair into an electrical circuit for operating a second electrical device.

2. Apparatus as recited in claim 1 wherein said sheet member is flexible and comprises a substrate of electrically insulative material.

3. Apparatus as recited in claim 2 including first and second leads of conductive material extending from respective contact zones of a pair of aligned and coupled contact zones, said conductive leads being electrically coupled to each other at an edge of said substrate to electrically couple said contact zones to each other.

4. Apparatus as recited in claim 2 including first and second conductive surfaces extending from respective contact zones of a pair of aligned and coupled contact zones, said conductive surfaces being electrically coupled to each other at an edge of said substrate to electrically couple said contact zones to each other.

5. Apparatus as recited in claim 2 wherein said conductor means for electrically connecting said pairs of coupled and aligned contact zones into an electrical circuit include first and second flexible conductor wires coupled to said first and second pairs of coupled and aligned contact zones respectively.

6. Apparatus as recited in claim 5 wherein said conductor means further include a first conductive lead electrically coupling said first pair of contact zones to a first edge region of a common edge of said substrate and a second conductive lead electrically coupling said second pair of contact zones to a second edge region of a common edge of said substrate.

7. Apparatus as recited in claim 1 wherein said sheet member is flexible and comprises at least in part a lamina formed of electrically conductive material.

8. Apparatus as recited in claim 7 wherein the contact zones of each of said aligned pairs of contact zones are electrically coupled to each other by the conductive material of said lamina.

9. Apparatus as recited in claim 7 wherein said first and second pairs of electrically conductive contact zones comprise first and second pairs of opposite surface regions of said lamina, and further including means for electrically insulating said first pair of opposed lamina surface regions from said second pair of opposed lamina surface regions.

10. Apparatus as recited in claim 7 wherein said conductor means for electrically connecting said pairs of coupled and aligned contact zones into an electrical circuit include first and second flexible conductor wires coupled to said first and second pairs of coupled and aligned contact zones respectively.

11. Apparatus as recited in claim 7 wherein opposed surface regions at one end of said sheet member are coated with insulative material and said first pair of electrically conductive contact zones comprise thin layers of conductive material printed over said insulative material coating said opposed surface regions.

12. Apparatus as recited in claim 1 wherein said sheet member is flexible and comprises an elongate strip having a pair of opposed transverse edges at longitudinal ends thereof, and wherein said conductive means for electrically connecting said contact zones of said first and second pairs into an electrical circuit are coupled to one of said transverse edges of said sheet member strip.

13. Apparatus as recited in claim 1 wherein said conductor means for electrically connecting said contact zones of said first and second pairs into an electrical circuit include a pair of flexible conductor wires.

14. Apparatus as recited in claim 1 wherein said electrical circuit includes an electrically powered device.

15. Apparatus as recited in claim 14 wherein said electrically powered device is selected from the group consisting of a lamp and a clock.

16. Apparatus as recited in claim 1 wherein the battery is elongate, said sheet member being interposed between said battery contacts and said battery electrode terminals and extending from a first one of the battery terminals at one end of the battery to a second one of the battery terminals at an opposed end of the battery and adjacent to the battery.

17. An assembly of a first battery powered electrical device, a second battery powered electrical device, and apparatus for accessing the battery power of the first device to operate the second device, comprising:

a first battery powered electrical device having a compartment for receiving at least one battery having a pair of spaced electrode terminals, and a pair of battery contacts situated in said compartment aligning with respective ones of said battery electrode terminals;

apparatus for accessing power of said at least one battery including a flexible sheet member arranged in par between said battery contacts and said battery electrode terminals and having opposite surfaces, a first pair of electrically coupled conductive contact zones on opposite sheet member surfaces in aligned relationship with each other, a second pair of electrically coupled conductive contact zones on opposite sheet member surfaces in aligned relationship with each other and spaced from said first pair of aligned and coupled contact zones, said contact zones of said first pair being electrically insulated from said contact zones of said second pair, and conductor means for electrically connecting said coupled and aligned contact zones of said first pair and said coupled and aligned contact zones of said second pair into an electrical circuit, and a second battery powered electrical device connected in said electrical circuit;

said flexible sheet member being situated inside said battery compartment of said first electrical device with contact zones of said first and second pairs of contact zones situated on a first one of said sheet member surfaces engaging respective ones of said battery contacts and contact zones of said first and second pairs of contact zones situated on the other of said sheet member surfaces engaging respective ones of said battery electrode terminals.

18. An assembly as recited in claim 17 wherein said flexible sheet member of said battery power accessing apparatus comprises a terminal length portion extending between an edge of said sheet member and a pair of said aligned contact zones proximate to said edge.

19. An assembly as recited in claim 18 wherein said battery receiving compartment of said electrical device includes a cover which closes said compartment to define an interior compartment space and an exterior thereof, and wherein at least part of said terminal length portion of said flexible sheet member is situated at the exterior of said battery compartment.

20. An assembly as recited in claim 17 wherein said first battery powered electrical device comprises a remote control.

21. An assembly as recited in claim 17 wherein said first battery powered electrical device comprises a personal stereo.

22. An assembly as recited in claim 17 wherein said first battery powered electrical device comprises an electronic calculator.

23. An assembly as recited in claim 17 wherein said second battery powered electrical device is selected from the group consisting of a lamp and a clock.

24. An assembly as recited in claim 17 wherein said sheet member is made of an insulative material.

25. Apparatus for accessing power of at least one battery of a first electrical device having a pair of spaced electrode terminals, the first electrical device having a pair of electrical contacts, each of said pair of electrical contacts of said first electrical device being in alignment with a respective one of said pair of battery electrode terminals, comprising:

a pair of electrically conductive coupling elements arranged between said battery electrode terminals and said electrical contacts of the first electrical device, each of said coupling elements structured and arranged to mate with a respective one of said battery electrode terminals and enable electrical connection of one of said electrical contacts of the first electrical device to one of said battery electrode terminals, a thin sheet member including a pair of electrically conductive material portions insulated from each other;

first conductor means for electrically connecting said pair of conductive coupling elements to respective ones of said pair of conductive material portions of said sheet member, said pair of conductive material portions of said sheet member being utilized to provide electrical power from said at least one battery to an electrical circuit for operating a second electrical device.

26. Apparatus as recited in claim 25 further comprising second conductor means for electrically connecting said pair of conductive material portions of said sheet member to electrical contacts of the second electrical device, said second conductor means including first and second flexible conductor wires coupled to a respective one of said pair of conductive coupling elements.

27. Apparatus as recited in claim 25 wherein said sheet member comprises a sheet of non-conductive, insulative material having opposed sides, each of said pair of conductive material portions being arranged on a respective one of said opposed sides of said sheet of non-conductive, insulative material.

28. Apparatus as recited in claim 25 wherein said sheet member comprises a sheet of electrically conductive material and insulation means defining said pair of conductive material portions.

* * * * *